United States Patent
Panzitta et al.

(10) Patent No.: US 8,473,316 B1
(45) Date of Patent: Jun. 25, 2013

(54) SYSTEM AND METHOD FOR ORDER PROCESSING STATE MANAGEMENT

(75) Inventors: Michael J. Panzitta, Bothell, WA (US); Xin Xiang, Seattle, WA (US); Gregory R. Swensen, Edmonds, WA (US); Christopher F. Weight, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 133 days.

(21) Appl. No.: 12/794,532

(22) Filed: Jun. 4, 2010

(51) Int. Cl.
*G06Q 10/00* (2012.01)
*G06Q 30/00* (2012.01)
*G06F 15/18* (2006.01)

(52) U.S. Cl.
USPC ............................................................ 705/7

(58) Field of Classification Search
None
See application file for complete search history.

(56) References Cited

U.S. PATENT DOCUMENTS

| | | | |
|---|---|---|---|
| 7,085,286 B2 * | 8/2006 | Dias et al. | 370/466 |
| 8,050,956 B2 | 11/2011 | Abo-Hasna et al. | |
| 2002/0138358 A1 * | 9/2002 | Scheer | 705/26 |
| 2002/0143598 A1 * | 10/2002 | Scheer | 705/9 |
| 2004/0153359 A1 * | 8/2004 | Ho et al. | 705/10 |
| 2004/0181775 A1 | 9/2004 | Anonsen et al. | |
| 2005/0049938 A1 * | 3/2005 | Venkiteswaran | 705/27 |
| 2007/0112647 A1 * | 5/2007 | Borders et al. | 705/27 |
| 2007/0156475 A1 * | 7/2007 | Berger et al. | 705/7 |
| 2007/0265862 A1 * | 11/2007 | Freund et al. | 705/1 |
| 2008/0046421 A1 | 2/2008 | Bhatia et al. | |
| 2008/0114626 A1 | 5/2008 | Baeuerle et al. | |
| 2008/0168109 A1 | 7/2008 | Gaurav et al. | |
| 2010/0138276 A1 | 6/2010 | Bildmayer et al. | |

OTHER PUBLICATIONS

Ariba, "cXML Solutions Guide," Relase 1.2.018, Document Version 2, Feb. 2008, 206 pages.
U.S. Appl. No. 12/794,519, filed Jun. 4, 2010.
Ariba, "cXML Solutions Guide," Relase 1.2.018, Document Version Feb. 2, 2008, 206 pages.

* cited by examiner

*Primary Examiner* — Jason Dunham
*Assistant Examiner* — Venay Puri
(74) *Attorney, Agent, or Firm* — Robert C. Kowert; Meyertons, Hood, Kivlin, Kowert & Goetzel, P.C.

(57) ABSTRACT

Various embodiments of a system and method for order processing state management are described. Embodiments may include an order handling system that includes multiple processing components for performing a respective portion of an order fulfillment process for purchase orders. The order handling system may also include a data store for storing state information of the purchase orders. To process a given purchase order, the order handling system may utilize each processing component to complete a respective portion of the order fulfillment process for that purchase order. The order handling system may also utilize each component to, based on the respective task performed, update state information corresponding to the aforesaid purchase order in the data store. The order handling system may, subsequent to an interruption of the processing of the purchase order, resume the processing of the purchase order based on the updated state information.

30 Claims, 12 Drawing Sheets

SYSTEM AND METHOD FOR ORDER PROCESSING STATE MANAGEMENT

BACKGROUND

Drop shipping may include supply chain management techniques that enable one entity (e.g., a retailer) to sell inventory items of another entity (e.g., a distributor or wholesaler) without physically taking delivery of the inventory items. In one example of a drop shipping process, a retailer receives an order for an item from a customer. The retailer may then place a drop shipment order request for that item with a wholesaler. The drop shipment order request may specify the item purchased by the customer as well as a shipment destination, such as the customer's residential address. The wholesaler may ship the item directly to the customer. Typically, the retailer's profit on such a transaction is the difference between the purchase price paid by the customer when purchasing the item from the retailer and the purchase price paid by the retailer when placing the drop shipment order request with the wholesaler. Drop shipping arrangements may be desirable to retailers because costs associated with acquiring and storing inventory can be mitigated.

Other entities may utilize drop shipping arrangements to meet various business requirements. In one example, a rewards program provider (e.g., a credit card issuer) may utilize drop shipping arrangements to provide rewards to customers participating in the program. For instance, a member of the rewards program may accrue points by participating in various activities (e.g., using a particular credit card to make purchases). These points may be redeemed for reward items (e.g., televisions, cameras, digital music players, and other consumer products). When a customer redeems points for a particular reward item, the rewards program provider may provide a corresponding drop shipment order request to a distributor that stocks that item in inventory. Similar to the wholesaler example described above, the distributor may ship the reward item directly to the rewards program member such that the rewards program provider does not have to take possession of the item.

In the example drop shipping arrangements described above, the entity that submits the drop ship order (e.g., the retailer or rewards program provider) may utilize various standards to communicate with the drop shipper (e.g., the wholesaler or distributor). One example of such a standard includes a particular implementation of eXtensible Markup Language ("XML") known as commerce XML ("cXML"). The cXML standard may be utilized to submit order requests to a drop shipper according to a process known as PunchOut. The drop shipping entity may operate one or more systems supporting cXML and PunchOut.

While the system and method for order processing state management is described herein by way of example for several embodiments and illustrative drawings, those skilled in the art will recognize that the system and method for order processing state management is not limited to the embodiments or drawings described. It should be understood, that the drawings and detailed description thereto are not intended to limit the system and method for order processing state management to the particular form disclosed, but on the contrary, the intention is to cover all modifications, equivalents and alternatives falling within the spirit and scope of the system and method for order processing state management as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Figure 1:
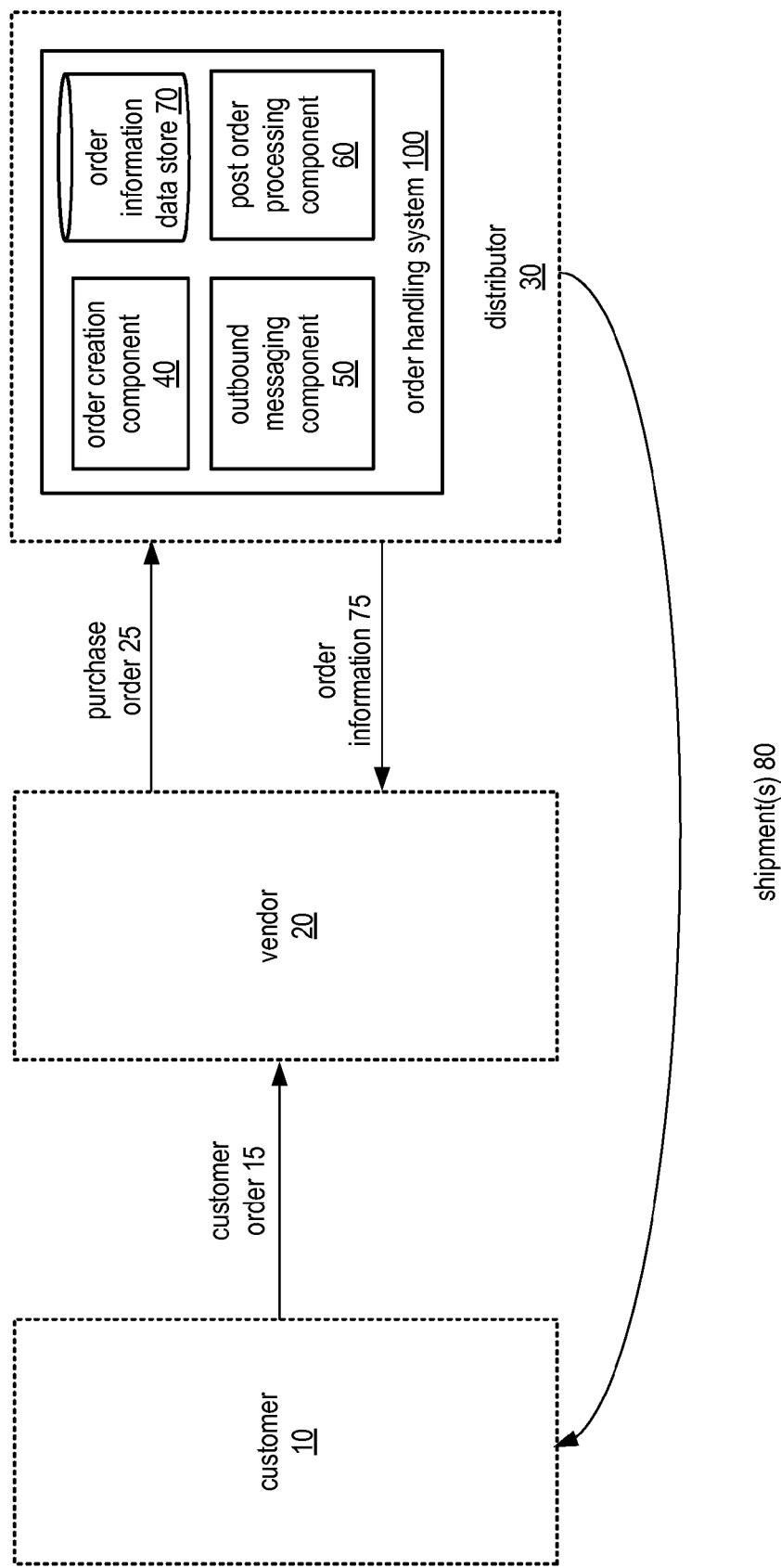
FIG. 1 illustrates a block diagram representing communications between a customer, a vendor, and a distributor within the system and method for order processing state management, according to some embodiments.

Various embodiments of a system and method for order processing state management are described. Embodiments may include various components, examples of which are illustrated in FIG. 1. In the illustrated embodiment, customer 10 may submit a customer order 15 for one or more items to vendor 20. For example, vendor 20 may provide customer 10 with a catalog of items that may be offered to the customer. For instance, such items may be offered for sale or offered as part of a rewards program. Customer order 15 may specify one or more of the items requested by customer 10. The vendor may generate a corresponding purchase order 25 based on customer order 15. For instance, purchase order 25 may specify the items requested by customer 10 in customer order 15. The purchase order may also include other order-related information, such as a shipping address to which the requested items should be shipped. In the illustrated embodiment, vendor 20 may serve as an intermediary between customer 10 and distributor 30. For example, vendor 20 may provide purchase order 25 to distributor 30, which may be the entity that is actually responsible for preparing and shipping a shipment of the requested items to customer 10. In one non-limiting example, distributor 30 may fulfill purchase orders in accordance with a drop shipping agreement with vendor 20.

Distributor 30 may prepare one or more shipments 80 that collectively include the items of purchase order 25 and ship shipment(s) 80 to customer 10. In various embodiments, distributor 30 may utilize a shipment carrier to handle the shipment of such shipments from one or more of the distributor's facilities to a location designated by the customer (e.g., as specified by the purchase order 25). In some cases, the shipment carrier may be an entity distinct from distributor 30. In other cases, the shipment carrier may be an entity that is wholly or partially owned and/or controlled by distributor 30.

The distributor 30 may also be responsible for notifying the vendor 20 of any information relevant to the processing of purchase order 25. For instance, distributor 30 may notify the vendor when any and/or all of the items specified by purchase order 25 have been confirmed as being ordered successfully. In another example, distributor 30 may notify the vendor when any and/or all of the items specified by purchase order 25 have been successfully shipped from one of the distributor's facilities. In yet another example, one or more items may not be available for immediate shipment for any of a variety of reasons (e.g., the item is not in stock, there is a processing delay at one of the distributor's facilities, etc.). In these cases, distributor 30 may notify vendor 20 of the delay. In other cases, items may be out-of-stock with no prospect of being restocked (e.g., discontinued items, limited edition items that have sold out, etc.). In these cases, distributor 30 may provide vendor 20 with a corresponding notification indicating that the portion of the purchase order corresponding to such item(s) will not be able to be fulfilled. Distributor 30 may provide any of these notifications as well as other information (as described in more detail below) to vendor 20 as order information 75.

Order information 75 may be utilized by vendor 20 for a variety of purposes. In one example, order information 75 may be utilized for bookkeeping, accounting, and/or auditing purposes. In another example, order information 75 may be utilized to keep customer 10 apprised of the status of any items ordered by the customer. For instance, vendor 20 may provide a customer-accessible website that enables customers to check the status of orders placed with the vendor. Such web-based status information may be based on order information 75 that the vendor receives from the distributor. In another example, order information 75 may be utilized for transaction-related purposes. For instance, in some cases, vendor 20 may not debit customer 10's account (e.g., a financial account or a rewards points account) until receiving notice from the distributor that customer 10's requested items have shipped.

FIG. 1 also illustrates various components of an order handling system 100, which may perform a variety of functions including but not limited to receiving purchase orders, processing purchase orders, and generating order information, among other things. These components are illustrated as order creation component 40, outbound messaging component 50, post order processing component 60, and order information data store 70. In various embodiments, each of these components may be implemented by one or more computer systems, such as computer system 1300 of FIG. 13. In various cases, each component may be implemented on distinct computer systems, all components may be implemented on the same computer system, or different groups of the components may be implemented on respective computer systems. In cases where multiple computer systems are utilized to implement the various components of order handling system 100, such computer systems may communicate via one or more networks, such as network 1385 of FIG. 13.

As described in more detail below, order handling system 100 may be configured to provide effective failover resiliency through component- or module-based state persistence, item-level visibility into any order processed, and message type flexibility when communicating with vendor 20.

Figure 2:
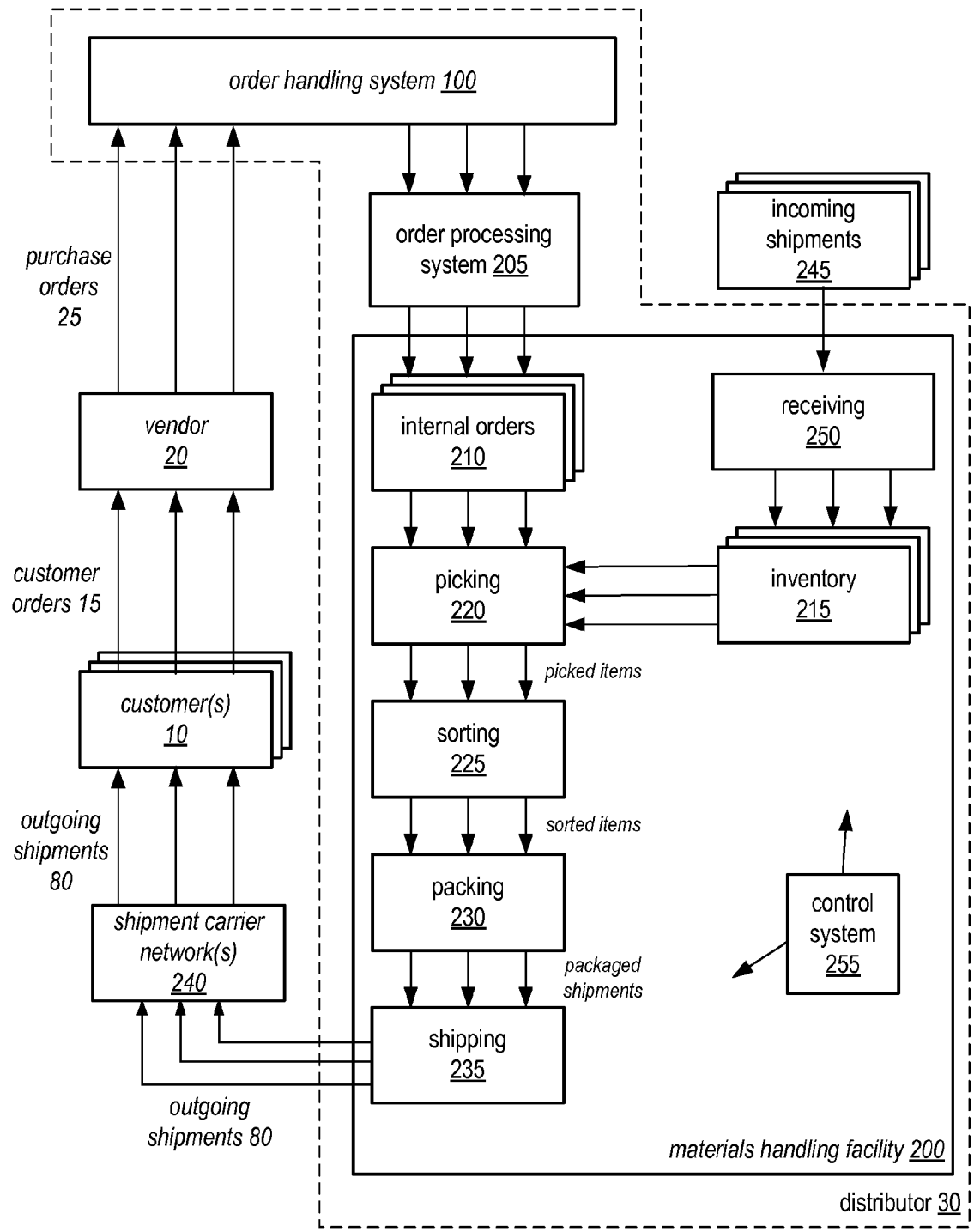
FIG. 2 illustrates a logical representation of the processing of orders by an order handling system, order processing system and materials handling facility, according to some embodiments.

FIG. 2 illustrates a logical representation or view of the operation of order handling system 100, an order processing system 205, and a materials handling facility 200, according to various embodiments of the system and method for order processing state management. In the illustrated embodiment, customers 10 may submit customer orders 15 to a vendor 20, as described above with respect to FIG. 1. For each customer order 15, vendor 20 may submit a corresponding purchase order 25 to order handling system 100. Order handling system 100 may process a given purchase order 25 by submitting a corresponding order to an order processing system, such as order processing system 205. Order processing system 205 may be configured to receive orders from order handling system 100 as well as other components (not illustrated). In one example, order processing system 205 may service order handling system 100 as well as one or more electronic marketplaces (not illustrated). In various embodiments, order processing system 205 may be configured to break up an order into multiple smaller internal orders 210 and assign such orders to one or more multiple materials handling facilities. In one non-limiting example, orders may be divided into multiple smaller orders due to item availability (e.g., some facilities may not have certain items of a purchase order in stock).

In various embodiments, distributor 30 may operate a fulfillment network including multiple materials handling facilities (each of which may be configured in a manner similar to that of materials handling facility 200). While only one materials handling facility is presented in the illustrated embodiment, it should be understood that a network of multiple materials handling facilities may be utilized to fulfill orders in various embodiments.

In various embodiments, a materials handling facility 200 may include one or more facilities that process, store, and/or distribute units of items including but not limited to warehouses, distribution centers, hubs, fulfillment centers, nodes in a supply chain network, retail establishments, shipping facilities, stock storage facilities, or any other facility configured to process units of items. For example, this Figure may illustrate an order fulfillment center of a distributor 30, according to some embodiments. Multiple internal orders 210 may specify one or more items from inventory 215 to be shipped to the respective customer. To fulfill internal orders 210, the one or more items specified in each order may be retrieved, or picked, from inventory 215 (which may also be referred to as stock storage) in the materials handling facility, as indicated at 220. Picked items may be delivered or conveyed, if necessary, to one or more stations in the materials handling facility for sorting 225 into their respective orders, packing 230, and finally shipping 235 to the customers 10. In various embodiments, picked items may be delivered to a station where individual units of items are associated with and placed into particular conveyance receptacles, which are then inducted into a conveyance mechanism. The conveyance receptacles may then be routed to particular destinations for the items contained within the receptacles in accordance with the requests (orders) currently being processed, e.g. to sorting stations, under direction of a control system (e.g., control system 255). A picked, packed and shipped order does not necessarily include all of the items ordered by the customer; an outgoing shipment to a customer may include only a subset of the ordered items available to ship at one time from an inventory storage location.

A materials handling facility may also include a receiving 250 operation for receiving shipments of stock (e.g., units of inventory items) from one or more sources and for moving or "stowing" the received stock into stock storage (e.g., inventory 215). The receiving 250 operation may also receive and process returned purchased or rented items or orders from customers. At least some of these items are typically returned to inventory 215. The various operations of a materials handling facility may be located in one building or facility, or alternatively may be spread or subdivided across two or more buildings or facilities. In various instances, it should be understood that references to elements, units, items, processes (or anything else) as being located within materials handling facility 200 may easily be extended to encompass elements, units, items, processes (or anything else) proximate to but not physically located within materials handling facility 200. For example, various elements, units, items, or processes (or anything else) may be implemented outside of the materials handling facility, according to some embodiments.

In various embodiments, outgoing shipments 80 including one or more items may be processed at shipping 235 and transferred to one or more shipment carrier network(s) 240. Each shipment carrier's network may include one or more distribution facilities (e.g., hubs) for storing items as well as vehicles for conveying shipments from such distribution facilities and/or materials handling facilities (such as materials handling facility 200) to various destinations (e.g., customer specified destinations).

While order handling system 100 is illustrated as operating in conjunction with a materials handling facility 200 of distributor 300, the order handling system may in some embodiments also be configured to handle orders that are fulfilled in facilities of other entities, such as a third-party order fulfillment entity.

In various embodiments, while order handling system 100 is described as managing orders for physical inventory 30, such orders need not be limited to physical inventory. For instance, in some embodiments, inventory may be digital or electronic inventory, such as electronic books or media (e.g., music, video, etc.). In the case of digital or electronic items, these items may be delivered to customer(s) 10 over a data network, such as the Internet.

Figure 3:
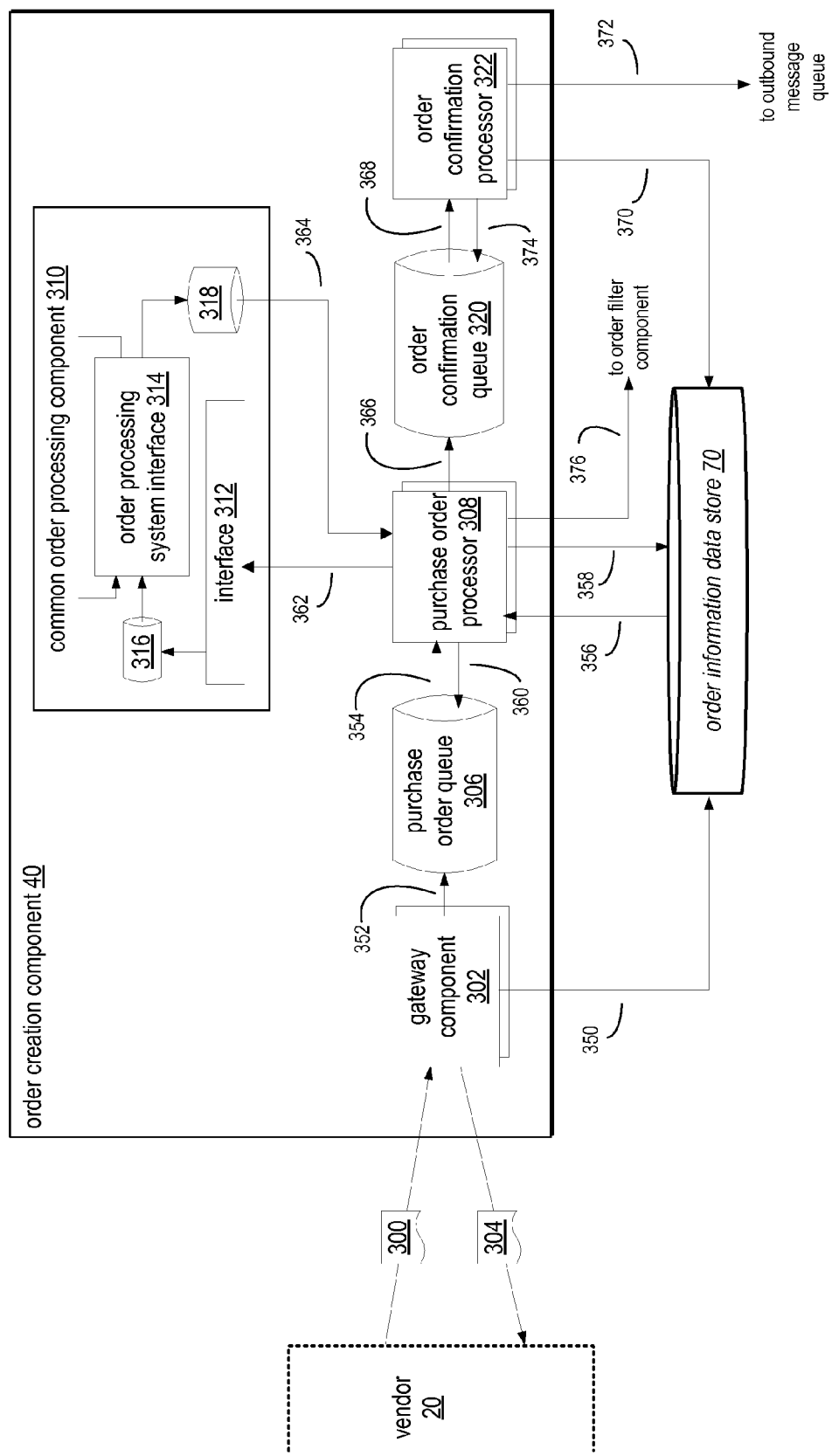
FIG. 3 illustrates a block diagram of one example of an order creation component, according to some embodiments.

FIG. 3 illustrates an example order creation component 40, according to some embodiments. In the illustrated example, order creation component 40 is illustrated as including a variety of components. In some embodiments, these components may be implemented on separate computer systems or the same computer system, such as computer system 1300 of FIG. 13. In some cases, different groups of the illustrated components may be implemented on separate computer systems. In various embodiments, one or more of the illustrated components may be implemented as a network-accessible service, such as the type of service utilized in service-oriented architectures. Any of the illustrated components may communicate over one or more networks, such as network 1385 of FIG. 13.

In the illustrated embodiment, order creation component 40 may receive a purchase order 300 from a computer system of vendor 20. Purchase order 300 may be one example of purchase order 25 described above. Gateway component 302 may serve as the interface between order creation component 40 and other systems that submit purchase orders, such as purchase order 300. Gateway component may validate purchase order 300 to determine whether it includes the requisite information that should be included within a valid purchase order (e.g., list of requested items, destination shipping address, etc.). If the purchase order is invalid, the order response 304 sent by gateway component 302 may indicate that the purchase order was invalid. Gateway component 302 may also authenticate the provider of the purchase order. For instance, to authenticate vendor 20, gateway component 302 may ensure that authentication information for vendor 20 within the purchase order matches authentication information on record with distributor 30. If the gateway component determines that the vendor is not authenticated, the order response 304 sent by gateway component 302 may indicate that the vendor is unauthorized to submit purchase orders for order fulfillment. Communications between the gateway component and the computer system of vendor 20 may adhere to any of a variety protocols, such as Hypertext Transfer Protocol (HTTP) or some other application layer protocol.

A valid purchase order received from an authenticated source may be parsed and relevant information may be stored in a new format independent from the format of the received purchase order. For instance, gateway component 302 may receive a purchase order that adheres to the cXML format. In this example, gateway component 302 may parse relevant purchase order information from the cXML purchase order and store the purchase order in a different format utilized by order handling system 100. As described in more detail below, outgoing messages may be formatted according to any format specified by vendor 20. In this way, order handling system 200 may be configured to utilize the same internal logic to process purchase orders irrespective of the inbound format of purchase orders or the outbound format of messages sent back to the vendor.

The new purchase order adhering to the internal format of the order handling system may be persisted (e.g., stored) by gateway component 302 in order information data store 70 (illustrated in FIG. 1) as a message data object (as illustrated at 350). This message data object may include a message identifier as well as the relevant contents of the received purchase order 300, such as a shipping address, vendor identifier, and list of requested items. Note that in various cases this message data object may not include some format specific information. For instance, if purchase order 300 adhered to the cXML format, the gateway component may create the message data object such that it does not include cXML specific information.

Figure 4:
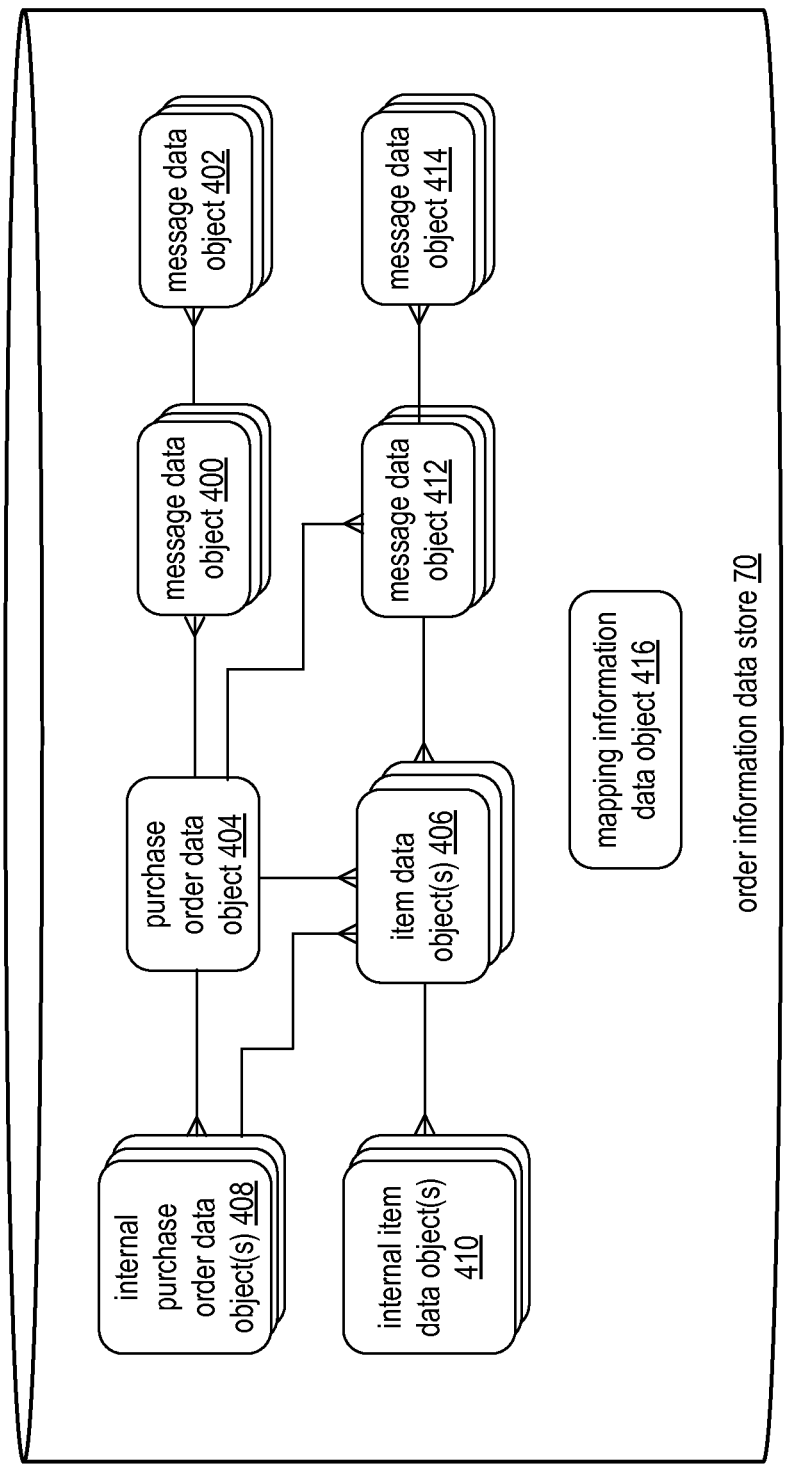
FIG. 4 illustrates a model of the relationships between order data objects, item data objects, and message data objects, according to some embodiments.

Referring collectively to FIG. 3 and FIG. 4, examples of message data objects are illustrated as message data objects 400, 402, 412, and 414. In the illustrated embodiments, purchase order message 300 may be parsed by the gateway component and stored within order information data store 70 as message data object 400. Message data objects, such as message data object 400, may include a variety of information.

Figure 5:
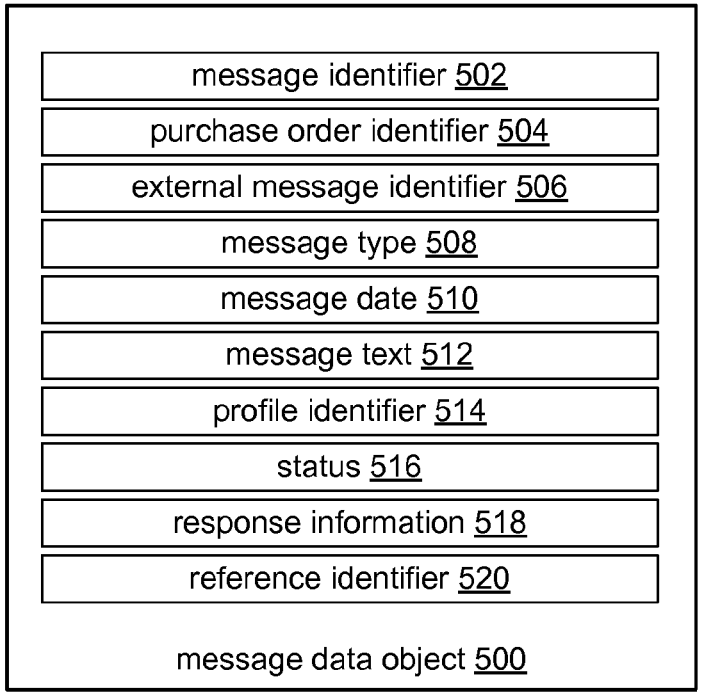
FIG. 5 illustrates an example message data object including multiple attributes, according to some embodiments.

One example of a message data object is illustrated as message data object 500 of FIG. 5. Message data object 500 may include a message identifier 502, which may be an identifier utilized by order handling system 100 to differentiate different messages. Purchase order identifier 504 may specify a purchase order with which the message is associated. For instance, in the illustrated embodiment of FIG. 4, message data object 400 may include a purchase order identifier that identifies purchase order data object 404 (described in more detail below). If a purchase order data object has not yet been created by the order handling system, this field of the message data object may remain empty or null. External message identifier 506 may include an identifier specified by the sender of the message (e.g., vendor 20). Message data object 500 may also include a message type 508, which may include but is not limited to a purchase order message type, confirmation message type, or shipping notice message type. Message type 508 may also specify the format of the message (e.g., email or cXML). Message date 510 may specify a date and/or time at which the message was received or sent by the order handling system. Message text 512 may include the contents of the message. Profile identifier 514 may be an identifier of a stored profile associated with the entity that submitted the message. In one example, profiles may specify different preferences for different vendors. For instance, a profile may specify which message format(s) should be utilized when communicating with the respective vendor. Status 516 may specify the processing status of the message. For instance, a message received by order handling system may be in a "received" state. A message created by the order handling system may be in a "generated" or "sent" state. Response information 518 may include different information dependent upon whether the message data object represents an inbound or outbound message. For inbound messages, response information 518 may include the response information sent to the entity that provided the inbound message (e.g., vendor 20). For outbound messages, response information 518 may include the response received from the recipient of the outbound message. In an example where messages are sent over HTTP, response information may specify an HTTP status code (e.g., HTTP status codes 200, 503, etc.) and an associated response (e.g., OK, SERVICE UNAVAILABLE, etc.). As described in more detail below, some message data objects may be linked with other message data objects within order information data store 70. For instance, an outbound message (e.g., response message 304) may be linked with a corresponding inbound message (e.g., purchase order 300). Reference identifier 520 may be the identifier of another message data object to which the message data object 500 is linked.

Figure 6:
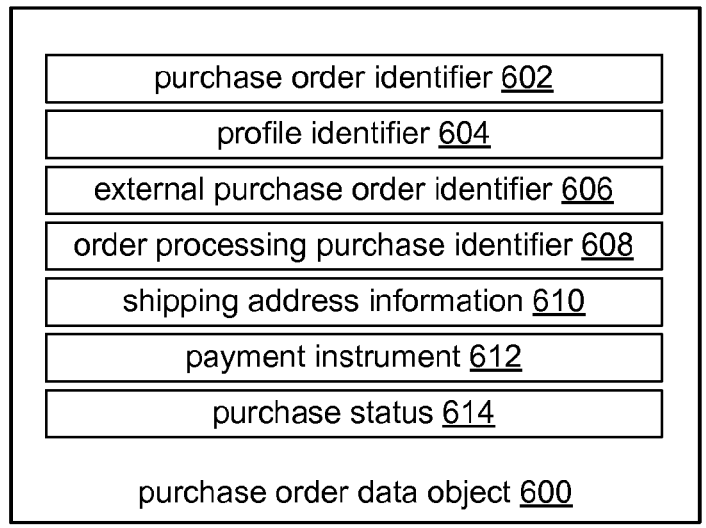
FIG. 6 illustrates an example purchase order data object including multiple attributes, according to some embodiments.

At 350 of FIG. 3, gateway component 302 may also generate within order information data store 70 a purchase order data object 404 associated with the received purchase order. An example purchase order data object is illustrated as purchase order data object 404 of FIG. 4. Additionally, an example format for such a purchase order data object is illustrated by purchase order data object 600 of FIG. 6. As illustrated, purchase order identifier 602 may be an identifier utilized by order handling system 100 to differentiate among different purchase order received by the system. Profile identifier 604 may be an identifier of a stored profile associated with the entity that submitted the message, as described above with respect to FIG. 5. External purchase order identifier 606 may be an identifier utilized by an external entity to identify the purchase order. For instance, external identifier 606 may be an identifier utilized by vendor 20. Order processing purchase identifier 608 may be a purchase identifier utilized by order processing system 205. Shipping address information 610 may specify an address to which the items of the purchase order are to be shipped. In some cases, shipping address information 610 may be an identifier or reference for determining a shipping address. Payment instrument 612 may specify the instrument to be used to pay for the items of the purchase order (e.g., an account identifier or other payment related information). Purchase status 614 may be an aggregate of the statuses of the individual items that make up the purchase order.

Returning to FIG. 3, at 350, gateway component 302 may also generate within order information data store 70 an item data object for each item of the purchase order. Examples of such item data objects are illustrated as item data object(s) 406 of FIG. 4. An example format for an item data object is illustrated by item data object 700 of FIG. 7. As illustrated, such item data object may include a purchase order item identifier 702, which may be an internal item identifier utilized by order handling system 100. Purchase order identifier 704 may be an identifier of the purchase order to which the item belongs. External line identifier 706 may be an identifier that associates the item with a particular line item position in the original purchase order that is submitted (e.g., purchase order 300). Internal order item identifier 708 may specify an item identifier utilized by order processing system 205. Latest message identifier 710 may specify an identifier of the most recent message sent with respect to this item (e.g., a confirmation message) (described in more detail below). Status 712 may specify the ordering status for this item (e.g., ordered, shipped or failed). Status text 714 may include any information pertaining to the status. For instance, if ordering of the item failed, status text 714 may specify a failure reason or error message. Internal order identifier 716 may be an identifier utilized by order processing system 205 to identify the internal order 210 to which the item belongs. Shipment identifier 718 may identify a shipment in which the item is located. This field may be empty prior to shipment of the item. Supply code 720 may specify the current inventory status of the item, which may be utilized to determine whether or not the processing of an item will be delayed. Supply code date 722 may specify a date and/or time at which the supply code 720 changed (e.g., the most recent date and/or time at which the supply code changed).

As described above, in response to receiving purchase order 300, gateway component 302 may generate within order information data store 70 one or more or more message data objects, a purchase order data object, and one or more item data objects. Order handling system 100 may generate data that associates or maps these items together within the data store. For instance, in the illustrated embodiment of FIG. 4, each item data object 406 may be associated with purchase order data object 404. In one example, the order handling system 100 may set the purchase order identifier field of each item data object 406 to be the purchase order identifier of purchase order data object 404. In other embodiments, such item to purchase order relationships may be specified in a separate mapping information data object 416.

In various embodiments, one or more purchase order level messages 400 may be associated with the purchase order data object. For instance, purchase order 300 may be stored as message data object 400 and associated with purchase order data object 404. In various embodiments, message data objects may be linked together, such as according to a parent-child relationship. For instance, message data object 400 of FIG. 4 may be the data object corresponding to a received purchase order message (e.g., purchase order 300) while message data object 402 may be the data object corresponding to the message sent in response to the purchase order message (e.g., response 304). In one example, to indicate the relationship between such messages, order handling system 100 may set the reference identifier field of message data object 402 to be the message identifier of message data object 400. In other embodiments, message-to-message relationships may be specified elsewhere, such as in mapping information data object 416.

As gateway component 302 receives, generates and sends various messages (e.g., messages 300 and 304), the gateway component may update the state of such messages within order information data store 70. In an example where message data object 400 represents purchase order message 300, gateway component 302 may set the status field of such object to a "received" state. In an example where message data object 402 represents response 304, the gateway component 302 may set the status field of such object to a "generated" state once the message has been generated and to a "sent" state once the message has been sent to the vendor (and/or once the vendor confirms receipt of the message).

Returning to FIG. 3, gateway component 302 may store the identifier of the purchase order on purchase order queue 306 (as illustrated at 352). In general, purchase order queue 306 (as well as any other queue described herein) may adhere to any queue format (e.g., first-in, first out or similar format). In one example, purchase order queue 306 (as well as any other queue described herein) may be implemented as a network-accessible queuing service. In various embodiments, by storing the purchase order identifier in purchase order queue 306, gateway component 302 may indicate to purchase order processor 308 that the purchase order is ready to be processed.

Purchase order processor 308 may pull purchase order identifiers from purchase order queue 306 and process such purchase orders. In the illustrated embodiment, purchase order processor 308 may remove the identifier of the purchase order identifier that corresponds to purchase order 300 from the queue (as illustrated at 254). In this example, purchase order processor 308 may access the corresponding purchase order data object from order information data store 70 (as illustrated at 356). For instance, purchase order processor 308 may identify the purchase order data object (e.g., purchase order data object 404) that includes the purchase order identifier (e.g., purchase order identifier 602) that matches the purchase order identifier pulled from the queue. Purchase order processor 308 may also determine the items that are to be ordered by identifying the purchase order items data objects (e.g., purchase order item data objects 406) that are mapped or associated with the identified purchase order data object. Based on this information, the purchase order processor 308 may generate an order request for those items and submit a corresponding order request to the common order processing component 310. Common order processing component 310 may serve as a wrapper around order processing system interface 314. This interface may be an interface to order processing system 205 described above. In various embodiments, the wrapper functionality provided by common order processing component 310 may ensure that order requests submitted by purchase order processor 308 are handled in a transactional manner. In one non-limiting example, this may include ensuring that each purchase order is handled as a set of atomic operations. The order request may be submitted by purchase order processor 308 to a programmatic interface 312, which may be an application programming interface (API), for example. Interface 312 may be configured to queue the order request in queue 316 to await processing by order processing system. Common order processing component 310 may be responsible for submitting the order to the order processing system 205 through interface 314. As is the case with other components of the order creation component 40, common order processing component 310 may in some embodiments be configured to create, maintain and/or update data objects within order information data store 70 that represent the state of the order submitted through interface 314. In this way, should the submission of an order through interface 314 fail, the order creation component 40 may be configured to resume processing of the order from the aforesaid state stored in order information data store 70. In other embodiments, this process may be handled by purchase order processor 308 on behalf of common order processing component 310. As is the case with any of the state information in order information data store 70, this order state information may in various embodiments be utilized to notify vendor 30 as to the state of an order submitted by the vendor.

Order processing component 314 may store results returned by the order processing system 205 in queue 318. The results may indicate, for each item of the processed purchase order, whether that item was successfully purchased (e.g., a successful item) or not successfully purchased (e.g., a failed item). For each successful item, queue 318 may include an order identifier returned by the order processing system. In various embodiments, queue 318 may also include an error or failure notification for any item that could not be successfully ordered (e.g., out of stock items).

Purchase order processor 308 may access the information of queue 318 as illustrated at 364. For each order identifier of a successfully ordered item, purchase order processor may generate a corresponding internal purchase order data object 408 (as illustrated in FIG. 4). Note that multiple internal orders 20 may be utilized to complete a single purchase order. Accordingly, there may be multiple internal purchase order data objects 408 that map to a single purchase order data object 404. In various embodiments, this mapping may be indicated by data within each internal purchase order data object 408. For instance, each internal purchase order data object created by purchase order processor 308 may include the order identifier provided by the order processing system 205 and the identifier of the purchase order to which the purchase order data object 404 corresponds. In other cases, purchase order data object 404 may include the internal order identifier of one or more or more internal purchase order data objects 408. In other cases, these associations may be specified by mapping information data object 416.

Purchase order processor 308 may also create an association between each item data object 406 and its parent internal purchase order data object 408. For instance, each item data object 406 may include an internal order identifier corresponding to one of the internal purchase order data objects 408. In other cases, this relationship may be specified by mapping information data object 416.

In various embodiments, purchase order processor 308 may also create an internal item data object 410 for each item data object 406. Each internal item data object may include the supply code and supply code date (described above) for the respective item.

Figure 7:
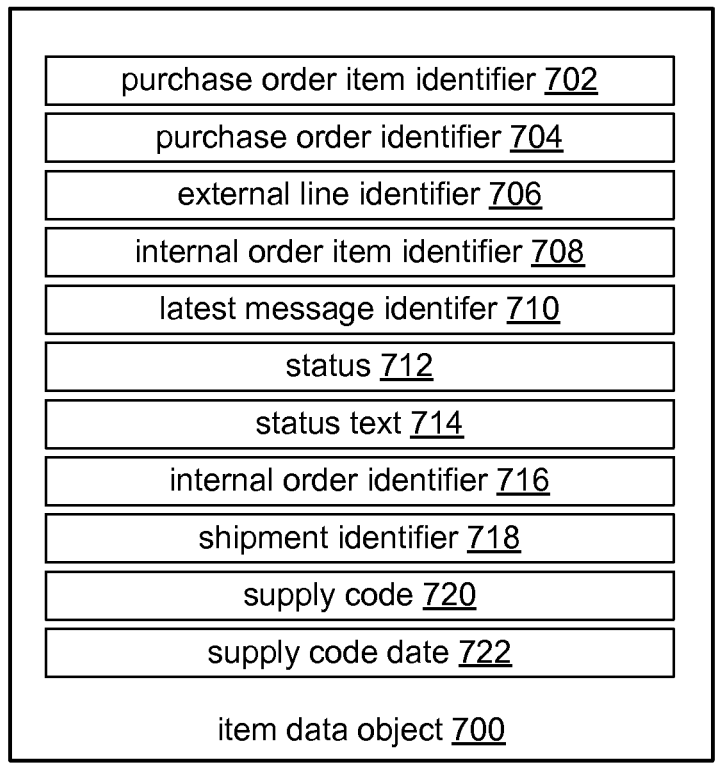
FIG. 7 illustrates an example item data object including multiple attributes, according to some embodiments.

In some embodiments, internal purchase order data objects 408 and internal item data objects 410 may not be utilized. Instead, the data of these objects may be incorporated into each item data object 406. For instance, as illustrated in FIG. 7, item data objects may include an internal identifier 716, line identifier 706, supply code 720 and supply code date 722. In any of the scenarios presented above, all of the above described objects that are generated by purchase order processor 308 may be stored in order information data store 70, as illustrated at 358.

Also note that, in the event that the processing of a purchase order by the purchase order processor 308 fails, the purchase order identifier of that purchase order may be returned to the queue to be retried at a later time, as illustrated at 360.

As described above, each purchase order may result in one or more internal orders (e.g., internal orders 210). The purchase order processor 308 may pass the identifiers of these orders to order confirmation queue 320, as illustrated at 366. Order confirmation processor 322 may generate one or more confirmation messages for each successful internal order. A given confirmation message may indicate that an order for a respective item has been placed. In various embodiments, order confirmation processor 322 may generate such messages in accordance with vendor-specified preferences, such as preferences stored in a vendor profile. In one non-limiting example, confirmation messages may be generated in an email format or a cXML format. The order confirmation processor may also store these messages within order information data store 70, as illustrated at 370. In one non-limiting example, message data object(s) 412 of FIG. 4 may be order confirmation messages. In the event that the message creation process fails for one or more orders, the order identifiers of these messages may be returned to queue 320, as illustrated at 374. Additionally, as each confirmation message is generated, the status or state of such messages may be updated in the corresponding data object of the order information data store. For instance, as described above, each message data object may include a status 516 to indicate whether the message has been generated and/or sent.

Figure 8:
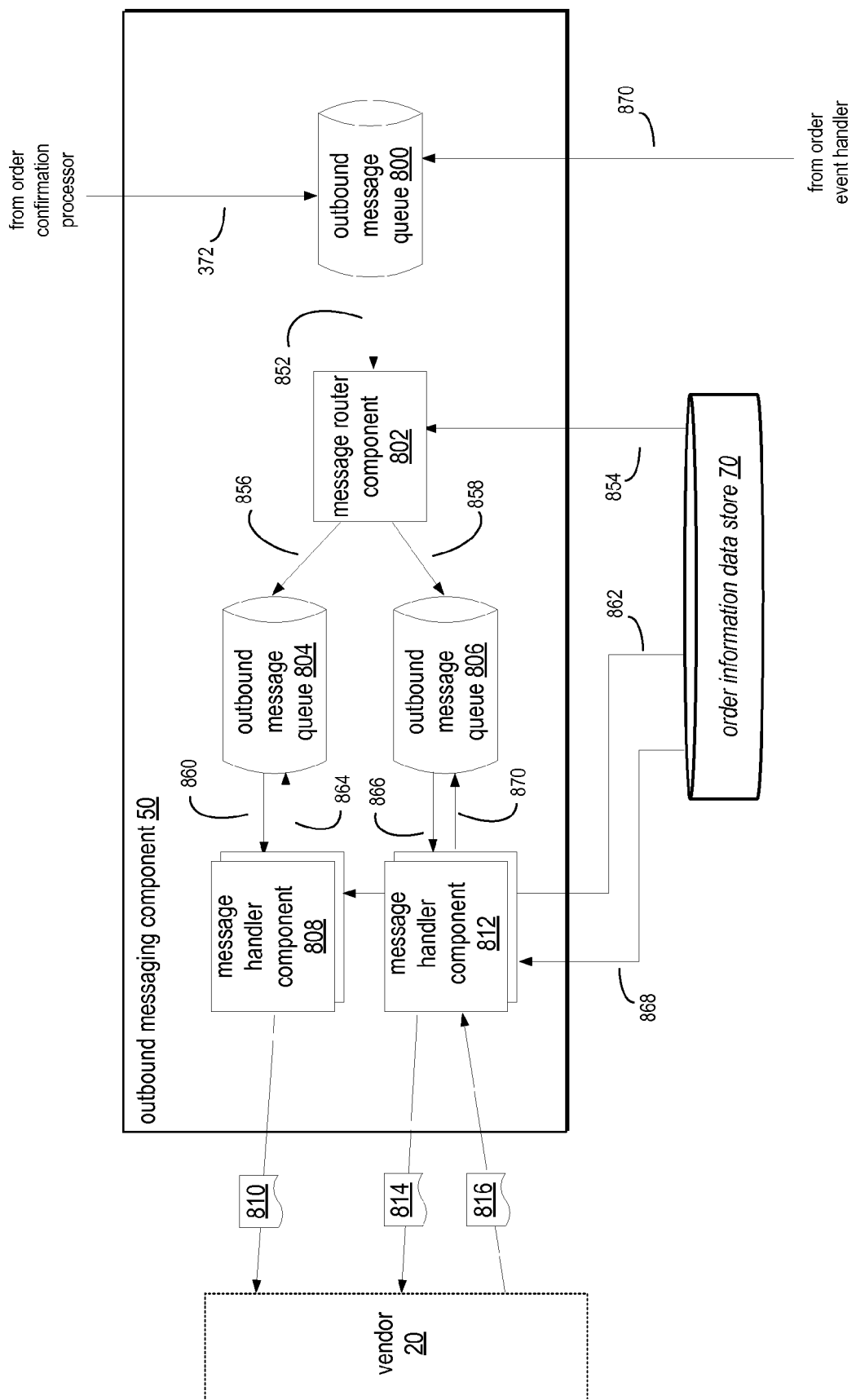
FIG. 8 illustrates a block diagram of one example of an outbound messaging component, according to some embodiments.

As illustrated at 372, order confirmation processor 322 may provide identifiers of the generated messages to the outbound message queue, which is illustrated as outbound message queue 800 of FIG. 8. FIG. 8 illustrates an outbound messaging component 50, which may be responsible for sending order information (e.g., order information 75) to one or more computer systems of vendor 20. Outbound messaging component 50 may include a message router component 802 configured to pull message identifiers from outbound message queue 800, as illustrated at 852. For a given identifier removed from the queue, message router component 802 may evaluate the message data object corresponding to that identifier within order information data store 70 to determine where a message should be routed. In the illustrated embodiment, different outbound queues may be associated with different message types. For instance, queue 804 may be associated with electronic mail ("email") messages and queue 806 may be associated with cXML messages (or some other message format). Accordingly, in some embodiments, to determine to which location the message should be routed, message router component 802 may be configured to evaluate the respective message data object in order information data store to determine the message type (e.g., message type 508). In one non-limiting example, message handler component 808 is configured to send email messages and message handler component 812 is configured to send cXML messages. Accordingly, if the message router component 802 determines that the message format is email, the message router component may store the identifier of that message on outbound message queue 804, as illustrated at 856. If the message router component 802 determines that the message format is cXML, the message router component may store the message identifier of that message on outbound message queue 806, as illustrated at 858.

In various embodiments, message handler component 808 may be configured to pull a message identifier from outbound message queue 804, as illustrated at 860. The message handler component may also be configured to retrieve the message corresponding to that identifier from order information data store 70, as illustrated at 862. Once the message is retrieved from the data store, message handler component 808 may send the message to a computer system of vendor 20, as illustrated by message 810. In one non-limiting example, message 810 is an email message.

In various embodiments, message handler component 812 may be configured to pull a message identifier from outbound message queue 806, as illustrated at 866. The message handler component may also be configured to retrieve the message corresponding to that identifier from order information data store 70, as illustrated at 868. Once the message is retrieved from the data store, message handler component 812 may send the message to a computer system of vendor 20, as illustrated by message 814. In one non-limiting example, message 814 is a cXML message sent over HTTP. Message handler component 812 may also be configured to receive a response from a computer system of vendor 20, as illustrated by response 816 (e.g., an HTTP response). In cases where responses (e.g., response 816) are received, message handler component 812 may generate a message data object for the response message and store that data object within order information data store 70. In various embodiments, the message data object for the response message may be associated with the corresponding message sent by the message handler component. In one example, message data object 412 may represent message 814 and message data object 414 may represent response 816. These two messages may be associated through data of the objects (e.g., reference identifier 520) or through mapping information, such as mapping information data object 416. In the event that the sending of a given message fails at the message handler component, the message may be returned to the respective queue for further processing, as illustrated at 864 and 870.

As illustrated at 870, outbound message component 50 may also receive, process, and send messages from order event handler 904 of post order processing component 60, which is described in more detail below with respect to FIG. 9. While messages from order creation component 40 may generally be order confirmation messages, messages provided by order event handler 904 may generally include ship notifications and delay notices for one or more items (or any other type of notification message related to an order).

As described above, a stored profile may be associated with different vendors 30 in various embodiments. These profiles may be stored within data store 70 or another data store not illustrated. In various embodiments, vendor profiles may store preferences pertaining to the message formats for notification messages that are sent to vendors. For instance, a vendor may specify that their notification messages should be sent according to cXML, email, or some other format. In various embodiments, a vendor's profile may also specify the structure of such notification messages. For instance, notification messages may be sent for entire orders or instead for individual items. Vendor profiles may also specify contact information (e.g., an email address) that should be used to contact the vendor in the event that the vendor's system fails to respond to the order handling system. In one example, after the order handling system completes a certain number of failed attempts of sending a notification message to the vendor, the order handling system may send a message to the vendor according to the aforesaid contact information.

In various embodiments, the order handling system may be configured to store messages (e.g., message data object of data store 70) in a format that is independent of the format in which the vendor sends messages (e.g., purchase orders) to the order handling system and/or independent of the message format of the messages provided to the vendor (e.g., order or item notifications). Additionally, for messages provided to the vendor, the format of theses messages may be specified by that vendor's corresponding profile. In one non-limiting example a vendor may submit a purchase order in cXML format. The order handling system may store relevant information from the purchase order as an XML data object. Additionally, any messages sent to the vendor for that purchase order may be sent according to a format specified by that vendor's profile (e.g., email, cXML, or some other format); this format may or may not be the same as the format in which the purchase order was received.

Figure 9:
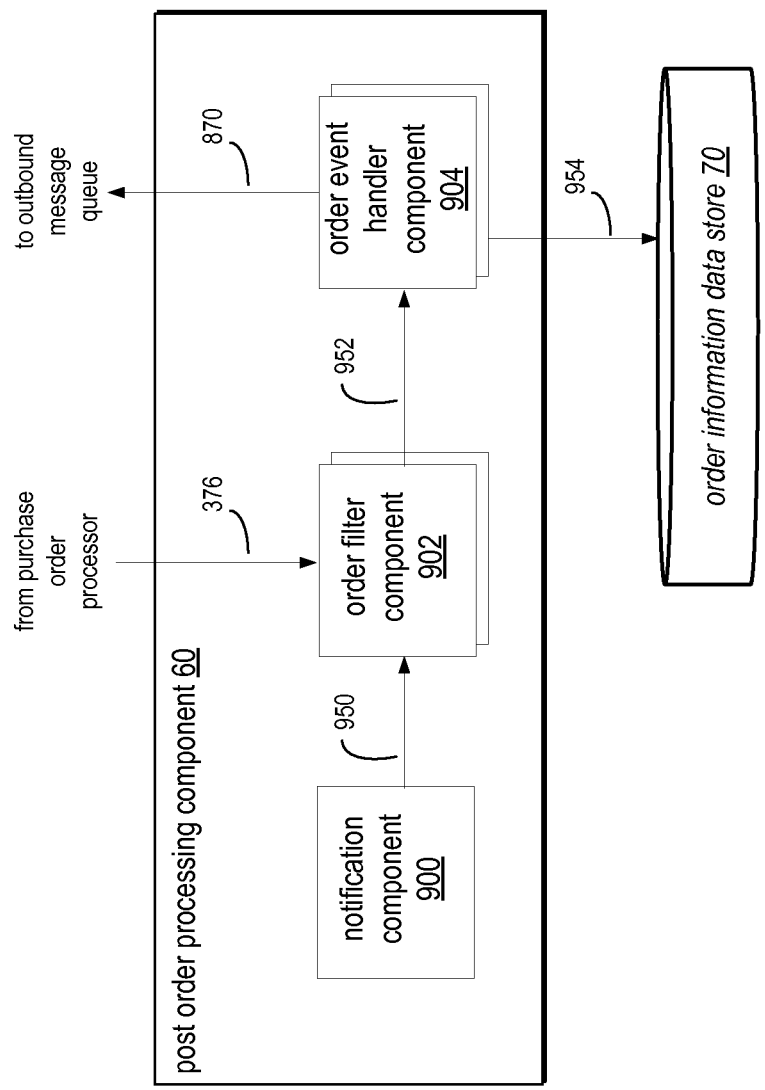
FIG. 9 illustrates a block diagram of one example of a post order processing component, according to some embodiments.

Post order processing component 60 of FIG. 9 may include a notification component 900 that is configured to generate notifications (e.g., push-based notifications) of the orders processed by order processing system 205. For instance, for each order processed by order processing system 205, notification component 900 may generate messages for delay notifications when an item is delayed (e.g., temporarily out of stock) and/or ship notifications when an item is eventually shipped. In some cases, the orders for which notification component 900 provides notification messages may include orders other than those submitted by order handling system 100. For instance, in addition to orders from order handling system 100, order processing system 205 may also handle orders from an e-commerce marketplace distinct from order handling system 100. To isolate notification messages relevant to order processing system 100, post order processing component 60 may include an order filter component 902. For instance, order filter component 902 may receive multiple notification messages, as illustrated at 950. Order filter component 902 may also be configured to receive an indication of which orders pertain to a purchase order submitted by the order handling system. In one example, each time purchase order processor 308 receives an order identifier from common order processor 310, order processor 308 may provide an indication of such order (e.g., an order identifier) to filter component 902, as illustrated at 376. When order filter component 902 determines that a notification received from notification component 900 pertains to one of the orders identified at 376, order filter component 902 may provide such notification to order event handler component 904, as illustrated at 952. In various embodiments, notifications that do not pertain to orders identified at 376 may be dropped by the order filter component 902. In various embodiments, for each notification received at 952, order event handler component 904 may be configured to generate a corresponding message (e.g., a shipment confirmation message or an order delay notification). As illustrated at 954, each generated message may be stored by order event handler component 904 within order information data store 70 as a message data object. Additionally, each of such message data objects may be associated with the item data objects to which they pertain in order information data store 70. Order handler component 904 may also send the identifiers of such messages to outbound message queue 800, as illustrated at 870. Outbound message component 50 may process such messages and send them to one or more computer systems of vendor 20 according to the techniques described above with respect to FIG. 8.

Figure 10:
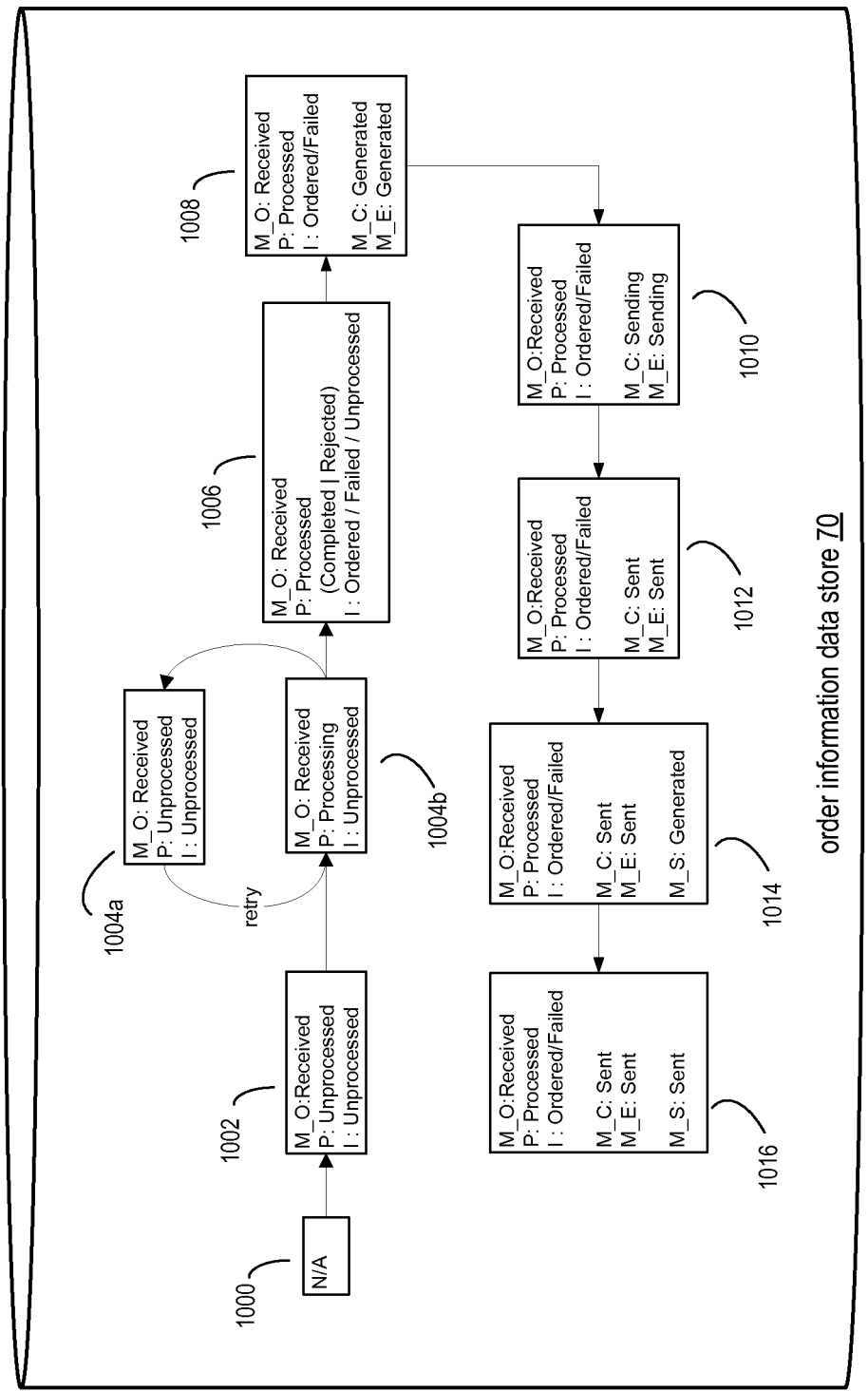
FIG. 10 illustrates example state information that may be stored in an order information data store, according to some embodiments.

As described above, the various components of order handling system 100 may track and update the state of a purchase order and the various messages that are associated with that purchase order (at an order-level and/or an item-level). FIG. 10 illustrates a state graph that represents the processing of a purchase order for multiple items. At state 1000, a purchase order message has not been received. At state 1002, a purchase order message (denoted as "M_O") has been received by the system. An example of a purchase order message is described above with respect to purchase order message 300. Order processing system 100 may record the state of the message by setting the status field (e.g., status 516) of a corresponding message data object to a received state. At state 1002, the purchase order specified by the message (denoted as "P" in the Figure) initially resides in an unprocessed state. Order handling system 100 may record the state of the purchase order by setting the status field of a corresponding purchase order data object (e.g., purchase status 614) to an unprocessed state. Likewise, one or more items of that purchase order (denoted as "I" in the Figure) may also reside in an unprocessed state. Order handling system 100 may record the state of each item by setting the status field (e.g., status field 712) of a corresponding item data object to an unprocessed state.

As illustrated by state 1004b, order handling system 100 may process the purchase order (denoted as "P" in the Figure) specified by the purchase order message. Prior to this state, the purchase order may reside in an unprocessed state, as illustrated at 1004a. As illustrated by state 1006, the order handling system may designate the state of the purchase order as "completed" or "rejected." In various embodiments, this evaluation may be performed at the order level. For instance, an invalid address or a rejected payment may result in an order level failure (e.g., all items of the order are failed). In cases where the purchase order is accepted at the order level, state 1006 may indicate that the purchase order was completed. In these cases, for each item of the purchase order (denoted as "I" in the Figure), the state may specify whether item has been ordered (e.g., "ordered"), whether the item has not been ordered due to an item level failure (e.g., out of stock, etc.), or whether the item has not been processed by the order processing system ("unprocessed"). In various embodiments, the order handling system 100 may designate the item's state in order information store 70 by setting the status field (e.g., status 712) of the corresponding item data object in the order information data store.

As illustrated by states 1008-1016, the order information store may also include state information for each of the messages generated by the order handling system. In state 1008, an order confirmation message (denoted as "M_C") and a corresponding electronic mail message (denoted as "M_E") are generated. Examples of such messages include the messages generated by order confirmation processor 322 described above. In state 1010, each of such messages is transitioned to a "sending" state, which indicates the messages are currently being sent. At 1012, the sending of such messages is complete, and the state of each message is transitioned to a "sent" state. As described above, the order handling system may also generate one or more shipment notifications when one or more items are shipped by the distributor. As illustrated at 1014, a shipment notification (denoted as "M_S") is transitioned to a "generated" state. When such shipment notification is sent by the order handling system to the vendor, the order handling system may transition the ship notification to a "sent" state. In various embodiments, the order handling system 100 may designate the message's state in order information store 70 by setting the status field (e.g., status 516) of the corresponding message data object in the order information data store.

In various embodiments, the state information described herein (e.g., the state information of FIG. 10) may be utilized to provide vendors with insight into the state of their submitted order at an order level and/or item level. As described above, this information may be provided through notification messages provided to vendor 30, such as messages 810 and 814. In some cases, the order handling system may generate a visual representation of order state information (e.g., a graphical representation on an electronic display). Such visualization may be provided to vendors and/or utilized by distributor 30 to track the status of orders.

In some embodiments, the order handling system may also be configured to generate alert or alarm messages based on one or more conditions. For instance, agents or managers of distributor 30 may provide order handling system 100 with conditions that specify an alarm or alert is to be generated if an order or item remains in a particular state beyond a threshold quantity of time. In response to the condition being met, order handling system 100 may generate an alarm or alert message indicating that the condition has been met (e.g., a message indicating an order or item has remained in an unprocessed state for too long). These alerts or alarms may be generated on computer systems or other electronic devices accessible to agents or management entities of distributor 30.

Example Methods

Embodiments of the system and method for order processing state management may include various methods, such as those of FIGS. 11 and 12 described below. In various embodiments, these methods may be implemented on a computer system, such as that of FIG. 13 described below. In various embodiments, the methods described herein may be performed by one or more components of order handling system 100 described above, each of which may also be implement on a computer system, such as that of FIG. 13 described below.

Figure 11:
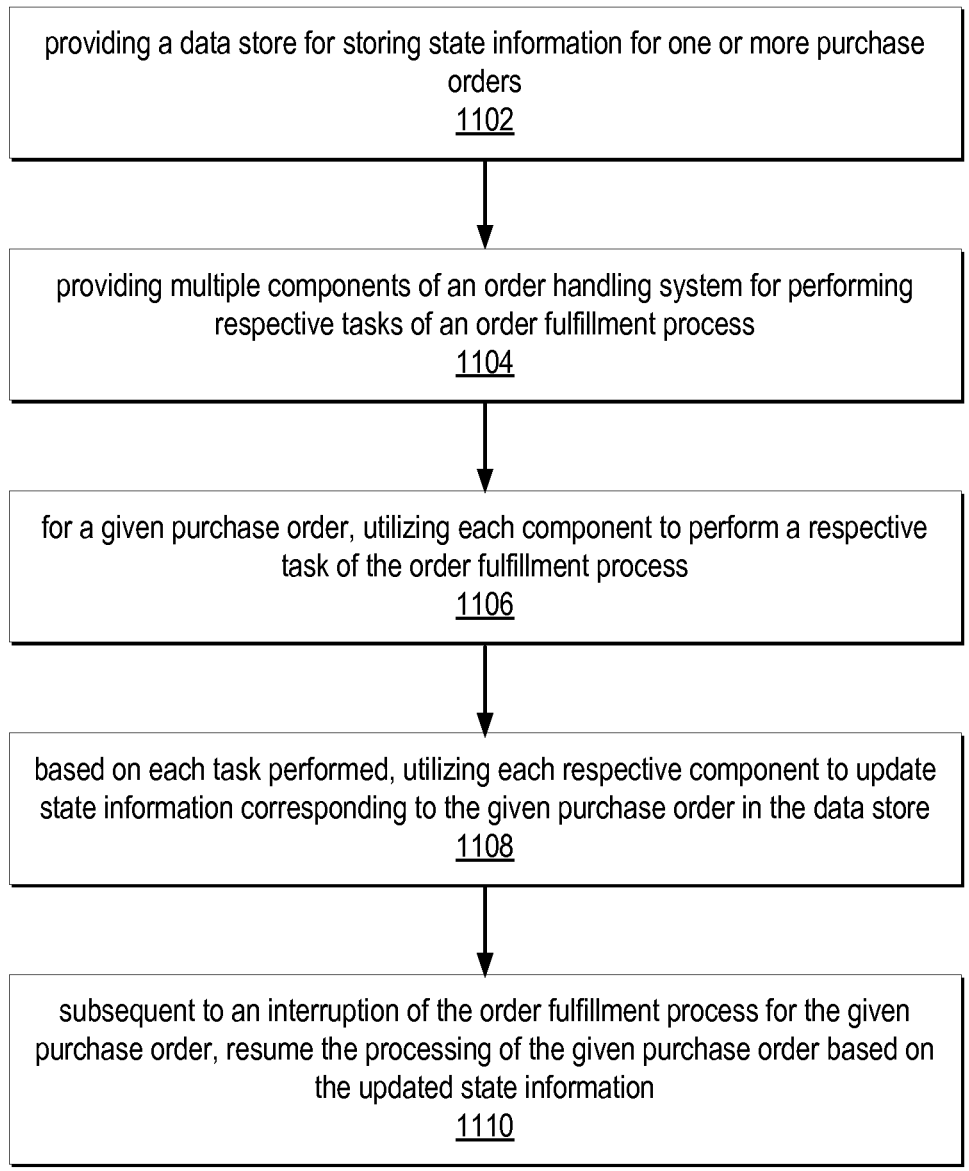
FIG. 11 illustrates a flowchart of an example method for the management and use of state information, according to some embodiments.

FIG. 11 illustrated an example method for managing state information of one or more purchase orders and utilizing such state information in the event of a system interruption. As illustrated by block 1102, the method may include providing a data store for storing state information for one or more purchase orders. In various embodiments, such a data store may be configured as a database, as one or more mass storage devices (e.g., physical disks, logical volumes, etc.) configured to store data blocks or files, or in any other suitable configuration for data storage. An example of such a data store is order information data store 70 described above.

As illustrated by block 1104, the method may also include providing multiple components of an order handling system for performing respective tasks of an order fulfillment process. An example order handling system is order handling system 100 described above. Likewise, examples of components of such an order handling system include order creation component 40, outbound messaging component 50, post order processing component 60, and the various subcomponents described above with respect to each of those components. In various embodiments, an order fulfillment process may include any set of tasks for completing an order from receiving an order to shipping items of that order to a recipient. Examples of such tasks may include any action performed by order handling system 100 described above (e.g., receiving a purchase order, submitting a corresponding order to an order processing system, confirming an order, routing one or more messages associated with the order, sending one or more messages associated with the order, processing order events, etc.).

As illustrated by block 1106, the method may include, for a given purchase order, utilizing each component to perform a respective task of the order fulfillment process. The respective task may include any of the tasks described herein including but not limited to receiving a purchase order, submitting a corresponding order to an order processing system, confirming an order, routing one or more messages associated with the order, sending one or more messages associated with the order, processing order events, or any other action associated with fulfilling a particular purchase order.

As illustrated by block 1108, the method may also include, based on each task performed, utilizing each respective component to update state information corresponding to the given purchase order in the data store. For instance, if a gateway component is utilized to receive a purchase order message, the method may include updating the state of that message to a received state within the data store (e.g., setting status 516 to a received state). In another example, if a purchase order component submits an order to an order processing system and receives indication that an item has been successfully order, the method may include updating a corresponding item data object in the data store to indicate that the item has been ordered (e.g., setting status 712 to an ordered state). In another example, if an order confirmation component generates a confirmation message, the method may include updating the state of a corresponding confirmation message data object within the data store (e.g., setting status 516 to a generated state). In yet another example, if a message handler component sends a message to a computer system of a vendor, the method may include updating the status of the corresponding message data object within the data store (e.g., setting status 516 to a sent state). One example of how state information may evolve over time is illustrated by the state information of FIG. 10. In various embodiments, the method described herein may include modifying state information in such a manner as various tasks are performed. In some embodiments, the method may include enforcing a requirement that state information be updated in a transactional manner.

As illustrated by block 1110, the method may include, subsequent to an interruption of the order fulfillment process for the given purchase order, resuming the processing of the given purchase order based on the updated state information. In various embodiments, an interruption in the order fulfillment process may occur for a variety of reasons. In some cases, such an interruption may be planned, such as for system maintenance or upgrades. In other cases, such an interruption may be caused by a system failure. Examples of system failure include any failure that adversely affects one or more components of order handling system 100. In one example, one of the queues described above could experience a failure resulting in loss of data on the queue. In this example, the method may include resuming the processing of the given purchase order by reloading the queue with the identifiers of data objects corresponding to that purchase order. For instance, in the event that a message queue fails, the actual messages on the queue may be safe from data loss because the messages may be stored as message data objects within an order information data store. In this non-limiting example, only identifiers of the messages are stored on the queue, not entire messages. This process may be similar to that described above with respect order confirmation processor 332, order event handler 904, and outbound message queue 800. Accordingly, in this non-limiting example, the method may include determining the state of the purchase order and reloading the failed queue with identifiers of messages that have been generated but not yet sent (e.g., as indicated by the status 516 field of the respective message data object). In other cases, a non-queue system component may fail (e.g., a gateway component, purchase order processor, order confirmation processor, message router, message handling component, order event handler, etc.). In these cases, the processing of any given purchase order may be resumed, either from the state of processing indicated by various queues, or by the state of processing indicated by the order information data store.

Figure 12:
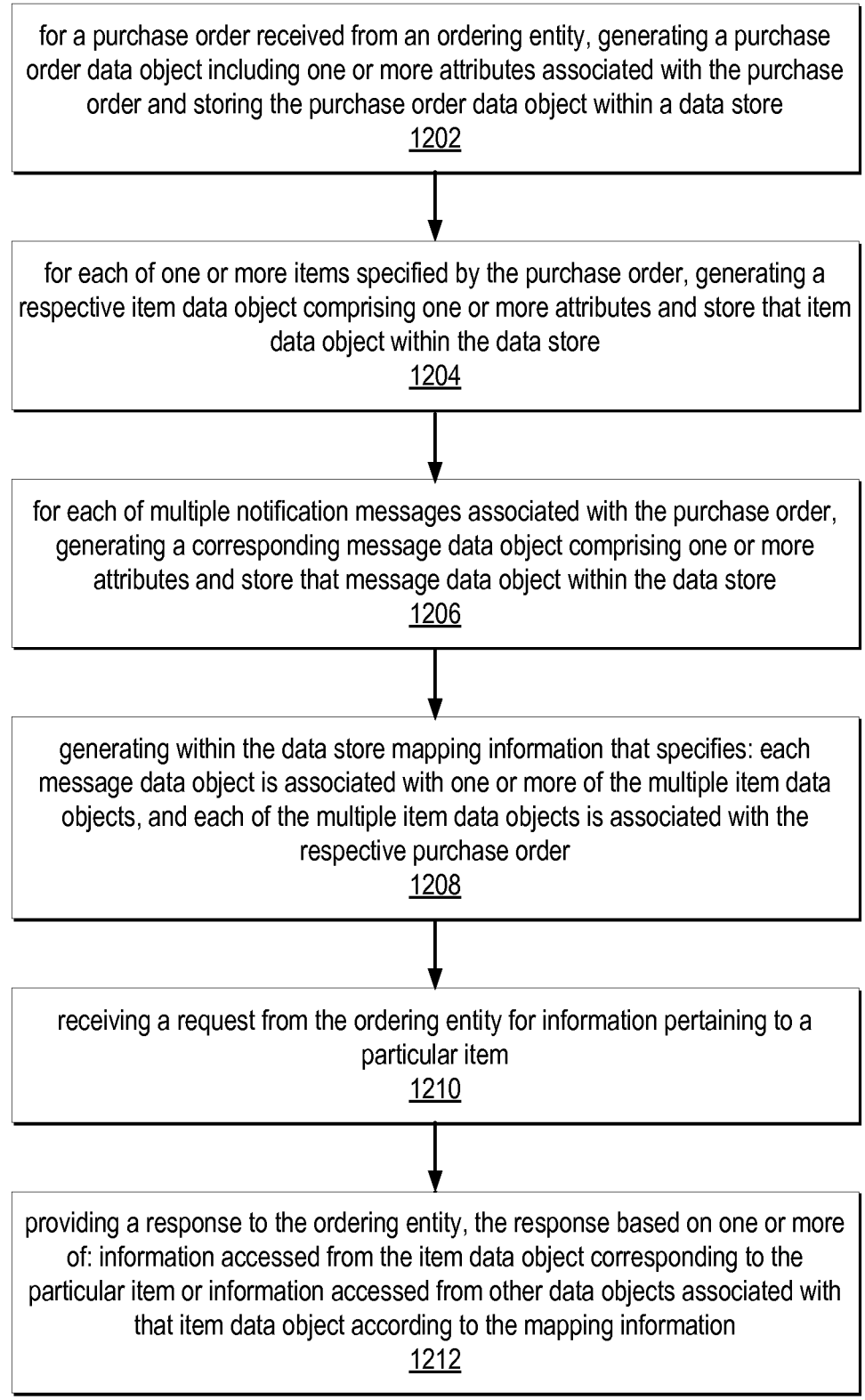
FIG. 12 illustrates a flowchart of an example method for generating mapping information, according to some embodiments.

FIG. 12 illustrates an example method for managing a data model with item and/or message level granularity. As illustrated by block 1202, the method may include, for a purchase order received from an ordering entity, generating a purchase order data object including one or more attributes associated with the purchase order and storing the purchase order data object within a data store (e.g., order information data store 70). An example of such a purchase order data object is described above with respect to purchase order data object 600 as well as the purchase order data objects created by gateway component 302. Purchase order data object 600 also includes various example attributes, such as items 602-614 described above.

As illustrated at block 1204, the method may also include, for each of one or more items specified by the purchase order, generating a respective item data object comprising one or more attributes and store that item data object within the data store. One example of such an item data object is described above with respect to item data object 700. The elements of that item data object (e.g., items 702-722) are examples of attributes of an item data object. As illustrated by block 1206, the method may include, for each of multiple notification messages associated with the purchase order, generating a corresponding message data object comprising one or more attributes and store that message data object within the data store. One example of a message data object is described above with respect to message data object 500. Likewise, items 502-520 are examples of such a message data object.

As illustrated by block 1208, the method may also include generating within the data store mapping information that specifies each message data object is associated with one or more of the multiple item data objects. Such mapping information may also specify that each of the multiple item data objects is associated with the respective purchase order. In this way, the method may maintain relationships between various data objects on an item and/or message level. One example of this mapping information is described above with respect to mapping information data object 416. In other cases, different portions of mapping information may be stored in different data objects. For instance, each item data object that maps to a particular purchase order data object by storing the purchase order identifier of the purchase order to which that purchase order data object corresponds. By utilizing this mapping information, each message may be tied to individual items, which may be associated by a common purchase order.

As illustrated by block 1210, the method may in various embodiments include receiving a request from the ordering entity for information pertaining to a particular item. For instance, the ordering entity may seek state information (e.g., ordered, failed, unprocessed) or one or more messages pertaining to a particular item. As illustrated by block 1212, the method may include providing a response to the ordering entity where such response is based on information access from the item data object corresponding to the particular item or information accessed from other data objects associated with that item data object according to the mapping information. Examples of this process are described below.

In one example, the method may include receiving a status request for a particular item, such as a status request received from an ordering entity (e.g., vendor 20). In response to the status request, the method may include, determining a state of the particular item from an attribute of the corresponding item data object within said data store. Such state may indicate whether an order for that item has been successfully placed within an order processing system. For instance, as described above, item data objects may include a status attribute (e.g., status 712) that indicates whether an order for the item has been successfully placed with order processing system 205. Once the state of the item has been determined (e.g., ordered, failed, or unprocessed), the method may include providing the ordering entity with a message or other information that specifies the state of the item. In one example, responses to status requests may be provided to a vendor as order information (e.g., order information 75). Note that status requests may be processed at an item for specific items, or for specific groups of items (which may or may not be items of the same order).

In another example, the method may include receiving from an ordering entity (e.g., vendor 20) a request for one or more notification messages associated with a particular item of the purchase order. For instance, a vendor system may have malfunctioned and the vendor may want check the messages that pertain to one or more items of one or more orders. Examples of these messages include order confirmation messages, ship notifications, and delay notices. In various embodiments, the method may include, based on the mapping information generated at 1208, identifying one or more message data objects that are associated with the identified item data object. For example, mapping information data object 416 may specify which of message data objects 412 are associated with a particular item data object 406. The method may include evaluating such a mapping information data object to determine such relationships. The method may also include providing the ordering entity with a message specified by the identified message data object. For instance, providing a message specified by the respective message data object may include providing any of the attributes 502-520 of that message data object (e.g., message text 512). In one example, the method may include selecting the most recent message generated for the item and providing that message to the ordering entity. In other cases, all relevant messages associated with the item may be provided to the ordering entity. By utilizing the techniques described herein, embodiments may provide item-level granularity into state information as well as system messages.

Example Computer System

Various embodiments of the system and method for order processing state management, as described herein, may be executed on one or more computer systems, which may interact with various other devices. Note that any component, action, or functionality described above with respect to FIGS. 1-12 may be implemented via one or more computer systems configured as computer system 1300 of FIG. 13, according to various embodiments. In the illustrated embodiment, computer system 1300 includes one or more processors 1310 coupled to a system memory 1320 via an input/output (I/O) interface 1330. Computer system 1300 further includes a network interface 1340 coupled to I/O interface 1330, and one or more input/output devices 1350, such as cursor control device 1360, keyboard 1370, and display(s) 1380. In some cases, it is contemplated that embodiments may be implemented using a single instance of computer system 1300, while in other embodiments multiple such systems, or multiple nodes making up computer system 1300, may be configured to host different portions or instances of embodiments. For example, in one embodiment some elements may be implemented via one or more nodes of computer system 1300 that are distinct from those nodes implementing other elements. For instance, one or more nodes might implement order creation component 40 and one or more other nodes might implement outbound messaging component 50.

In various embodiments, computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

System memory 1320 may be configured to store program instructions 1322 and/or data 1332 accessible by processor 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions 1322 implementing any of the elements of order handling system 100 are shown stored within system memory 1320. Additionally, data 1332 of memory 1320 may store any of the information or data structures described above, in some embodiments. In some embodiments, program instructions and/or data may be received, sent or stored upon different types of computer-accessible media or on similar media separate from system memory 1320 or computer system 1300. While computer system 1300 is described as implementing the functionality of order handling system 100, any of the components or systems illustrated above may be implemented via such a computer system (e.g., order processing system 205).

In one embodiment, I/O interface 1330 may be configured to coordinate I/O traffic between processor 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices (e.g., any other component of the Figures described above) attached to a network 1385 or between nodes of computer system 1300. Network 1385 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1350 may, in some embodiments, include one or more display terminals, keyboards, keypads, touchpads, scanning devices, voice or optical recognition devices, or any other devices suitable for entering or accessing data by one or more computer systems 1300. Multiple input/output devices 1350 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1340.

Figure 13:
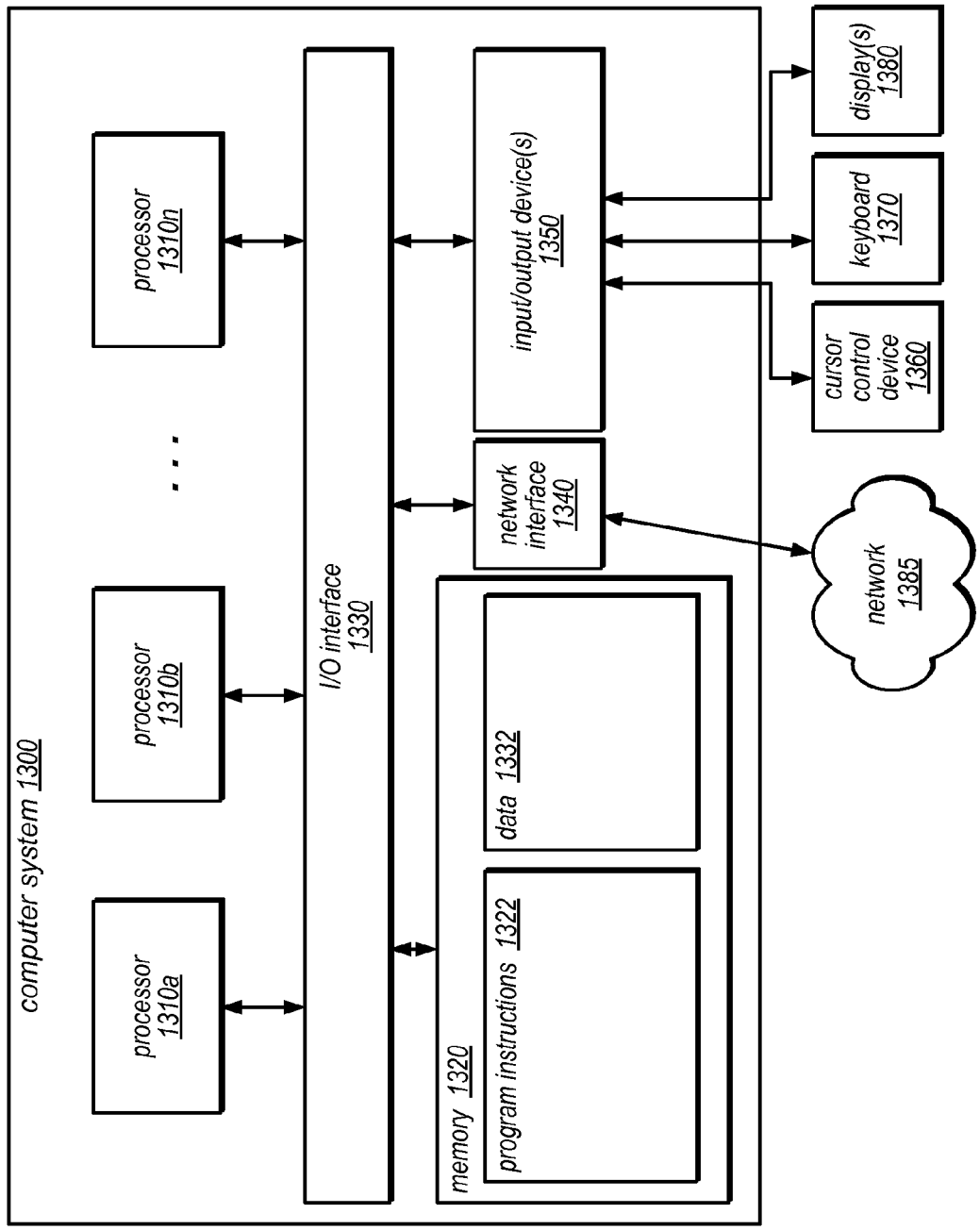
FIG. 13 illustrates one example of a computer system suitable for implementing various elements of the system and method for order processing state management, according to some embodiments.

As shown in FIG. 13, memory 1320 may include program instructions 1322 configured to implement any element or action described above. In one embodiment, the program instructions may implement the methods described above, such as the method illustrated by FIGS. 11-12. In other embodiments, different elements and data may be included. Note that data 1332 may include any data described above, such as the data of order information data store 70.

Those skilled in the art will appreciate that computer system 1300 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:
    one or more computers, the one or more computers comprising one or more memories and one or more processors, wherein the one or more memories comprise program instructions executable by the one or more computers to implement an order handling system comprising a plurality of order processing components each configured to perform a respective portion of an order fulfillment process for one or more purchase orders, wherein the order handling system is configured to provide interruption resiliency through component-based state persistence;
    a data store configured to store state information for one or more purchase orders received by the order handling system;
    wherein to process a given purchase order for the order fulfillment process, each of at least some of the order processing components is configured to:
        perform a respective task to complete a portion of the order fulfillment process for the given purchase order; and
        based on the respective task performed, update state information corresponding to the given purchase order in the data store, wherein said update state information includes update a message data object, wherein the message data object includes: a message identifier for a message sent or received as part of performing the respective task, a purchase order identifier for the given purchase order, and status information for the message;
    wherein the order handling system is configured to, subsequent to an interruption of the order fulfillment process for the given purchase order, resume the processing of the given purchase order based on updated state information for that given purchase order, the updated state information for that given purchase order being previously updated by different processing components that each: completed a different task for the given purchase order and updated the state information to indicate that the different task was completed.

2. The system of claim 1, wherein the interruption of the order fulfillment process is caused by a failure within the order handling system.

3. The system of claim 1, wherein the state information indicates one or more of:
    a processing state of the order handling system with respect to the given purchase order,
    a state of one or more orders submitted to an order processing system, wherein the one or more orders specify at least one item of the given purchase order;
    a state of one or more items of a given purchase order; or
    a state of one or more order notification messages to be sent to an entity that submitted the given purchase order.

4. The system of claim 1, wherein a first order processing component of the order handling system is configured to store a data object within the data store and store an identifier of that data object in a queue accessible to a second order processing component of the order handling system.

5. The system of claim 4, wherein said second order processing component is configured to receive the identifier of the data object from the queue and retrieve the corresponding data object from the data store.

6. The system of claim 4, wherein said data object is one of: a purchase order data object that specifies details of the given purchase order, an item data object including information identifying an item of the given purchase order, or a message data object comprising data representing a message received or sent by the message handling system with respect to the given purchase order.

7. The system of claim 1, wherein the order handling system comprises an order creation component configured to:
    receive a purchase order for one or more items,
    submit an order for said one or more items to an order processing system, and
    based on a response from the order processing system, generate a message for at least one of the one or more items; wherein said message indicates whether an order for that item was successfully placed.

8. The system of claim 7, wherein the order handling system comprises an outbound messaging component configured to send the generated message to an entity that submitted the given purchase order.

9. The system of claim 8, wherein the outbound messaging component is configured to send the generated message in accordance with a format specified by the entity that submitted the given order.

10. The system of claim 1, wherein the order handling system comprises a post order processing component configured to:
    receive multiple notifications for a plurality of orders,
    identify a subset of the notifications that correspond to the given purchase order, wherein said notifications are associated with a shipment delay for one or more items of the given purchase order or a shipment confirmation for one or more items of the given purchase order, and
    for each at least some of the subset of notifications, generate a message specifying the notification, wherein the message is to be sent to an entity that submitted the given purchase order.

11. A computer-implemented method, comprising:
    processing a given purchase order in an order handling system including a plurality of order processing components for performing a respective portion of an order fulfillment process for purchase orders, the order handling system providing interruption resiliency through component-based state persistence;
    wherein said processing the given purchase order for the order fulfillment process comprises utilizing each processing component for:
        performing a respective task to complete a portion of the order fulfillment process for the given purchase order, wherein the respective task includes a task performed in response to receiving the given purchase order; and
        based on the respective task performed, updating state information corresponding to the given purchase order in a data store, wherein said updating state information includes updating a message data object, wherein the message data object includes: a message identifier for a message sent or received as part of performing the respective task, a purchase order identifier for the given purchase order, and status information for the message;

subsequent to an interruption of the processing of the given purchase order, resuming the processing of the given purchase order based on updated state information for that given purchase order, the updated state information for that given purchase order being previously updated by different processing components that each: completed a different task for the given purchase order and updated the state information to indicate that the different task was completed.

12. The computer-implemented method of claim 11, wherein the interruption of the order fulfillment process is cause by a failure within the order handling system.

13. The computer-implemented method of claim 11, wherein the state information indicates one or more of:
   a processing state of the order handling system with respect to the given purchase order,
   a state of one or more orders submitted to an order processing system, wherein the one or more orders specify at least one item of the given purchase order;
   a state of one or more items of a given purchase order; or
   a state of one or more order notification messages to be sent to an entity that submitted the given purchase order.

14. The computer-implemented method of claim 11, wherein the method comprises utilizing a first order processing component of the order handling system to store a data object within the data store and to store an identifier of that data object in a queue accessible to a second order processing component of the order handling system.

15. The computer-implemented method of claim 14, wherein the method comprises utilizing the second order processing component to receive the identifier of the data object from the queue and to retrieve the corresponding data object from the data store.

16. The computer-implemented method of claim 14, wherein said data object is one of: a purchase order data object that specifies details of the given purchase order, an item data object including information identifying an item of the given purchase order, or a message data object comprising data representing a message received or sent by the message handling system with respect to the given purchase order.

17. The computer-implemented method of claim 11, wherein the method comprises performing an order creation process including:
   receiving a purchase order for one or more items,
   submitting an order for said one or more items to an order processing system, and
   based on a response from the order processing system, generating a message for at least one of the one or more items; wherein said message indicates whether an order for that item was successfully placed.

18. The computer-implemented method of claim 17, wherein the method comprises performing an outbound messaging process by sending the generated message to an entity that submitted the given purchase order.

19. The computer-implemented method of claim 18, wherein the generated message is sent in accordance with a format specified by the entity that submitted the given order.

20. The computer-implemented method of claim 11, wherein the method comprises performing a post order process including:
   receiving multiple notifications for a plurality of orders,
   identifying a subset of the notifications that correspond to the given purchase order, wherein said notifications are associated with a shipment delay for one or more items of the given purchase order or a shipment confirmation for one or more items of the given purchase order, and
   for each at least some of the subset of notifications, generating a message specifying the notification, wherein the message is to be sent to an entity that submitted the given purchase order.

21. A computer-readable storage medium, storing program instructions computer-executable on a computer system to implement an order handling system comprising a plurality of order processing components each configured to perform a respective portion of an order fulfillment process for one or more purchase orders, wherein the order handling system is configured to provide interruption resiliency through component-based state persistence, wherein the order handling system is configured to:
   access a data store configured to store state information for one or more purchase orders received by the order handling system;
   wherein to process a given purchase order for the order fulfillment process, each of at least some of the order processing components are configured to:
      perform a respective task to complete a portion of the order fulfillment process for the given purchase order; and
      based on the respective task performed, update state information corresponding to the given purchase order in the data store, wherein said update state information includes update a message data object, wherein the message data object includes: a message identifier for a message sent or received as part of performing the respective task, a purchase order identifier for the given purchase order, and status information for the message;
   wherein the order handling system is configured to, subsequent to an interruption of the order fulfillment process for the given purchase order, resume the processing of the given purchase order based on updated state information for that given purchase order, the updated state information for that given purchase order being previously updated by different processing components that each: completed a different task for the given purchase order and updated the state information to indicate that the different task was completed.

22. The medium of claim 21, wherein the interruption of the order fulfillment process is caused by a failure with the order handling system.

23. The medium of claim 21, wherein the state information indicates one or more of:
   a processing state of the order handling system with respect to the given purchase order,
   a state of one or more orders submitted to an order processing system, wherein the one or more orders specify at least one item of the given purchase order;
   a state of one or more items of a given purchase order; or
   a state of one or more order notification messages to be sent to an entity that submitted the given purchase order.

24. The medium of claim 21, wherein a first order processing component of the order handling system is configured to store a data object within the data store and store an identifier of that data object in a queue accessible to a second order processing component of the order handling system.

25. The medium of claim 24, wherein said second order processing component is configured to receive the identifier of the data object from the queue and retrieve the corresponding data object from the data store.

26. The medium of claim 24, wherein said data object is one of: a purchase order data object that specifies details of the given purchase order, an item data object including information identifying an item of the given purchase order, or a message data object comprising data representing a message received or sent by the message handling system with respect to the given purchase order.

27. The medium of claim 21, wherein the order handling system comprises an order creation component configured to:
   receive a purchase order for one or more items,
   submit an order for said one or more items to an order processing system, and
   based on a response from the order processing system, generate a message for at least one of the one or more items; wherein said message indicates whether an order for that item was successfully placed.

28. The medium of claim 27, wherein the order handling system comprises an outbound messaging component configured to send the generated message to an entity that submitted the given purchase order.

29. The medium of claim 28, wherein the outbound messaging component is configured to send the generated message in accordance with a format specified by the entity that submitted the given order.

30. The medium of claim 21, wherein the order handling system comprises a post order processing component configured to:
   receive multiple notifications for a plurality of orders,
   identify a subset of the notifications that correspond to the given purchase order, wherein said notifications are associated with a shipment delay for one or more items of the given purchase order or a shipment confirmation for one or more items of the given purchase order, and
   for each at least some of the subset of notifications, generate a message specifying the notification, wherein the message is to be sent to an entity that submitted the given purchase order.

* * * * *

UNITED STATES PATENT AND TRADEMARK OFFICE
CERTIFICATE OF CORRECTION

PATENT NO. : 8,473,316 B1  
APPLICATION NO. : 12/794532  
DATED : June 25, 2013  
INVENTOR(S) : Michael J. Panzitta et al.

It is certified that error appears in the above-identified patent and that said Letters Patent is hereby corrected as shown below:

In The Claims:

Claim 6, col. 22, line 16, please delete "message handling system" and insert --order handling system-- in place thereof.

Claim 16, col. 23, lines 42-43, please delete "message handling system" and insert --order handling system-- in place thereof.

Claim 26, col. 25, line 4, please delete "message handling system" and insert --order handling system-- in place thereof.

Signed and Sealed this  
Fifth Day of November, 2013

Teresa Stanek Rea  
*Deputy Director of the United States Patent and Trademark Office*